United States Patent [19]

Matsuura et al.

[11] Patent Number: 5,065,271
[45] Date of Patent: Nov. 12, 1991

[54] THIN FILM MAGNETIC HEAD APPARATUS AND METHOD OF MANUFACTURING THE SAME

[75] Inventors: Tsukasa Matsuura; Jun Fujita; Manabu Uchizawa; Shigehisa Suzuki, all of Amagasaki, Japan

[73] Assignee: Mitsubishi Denki Kabushiki Kaisha, Tokyo, Japan

[21] Appl. No.: 484,796

[22] Filed: Feb. 26, 1990

[30] Foreign Application Priority Data

Feb. 28, 1989 [JP] Japan .................... 1-47021

[51] Int. Cl.[5] ........................ G11B 5/31; G11B 21/16
[52] U.S. Cl. .................................... 360/126; 360/104
[58] Field of Search ....................... 360/104, 103, 126

[56] References Cited

U.S. PATENT DOCUMENTS

| | | | |
|---|---|---|---|
| 4,261,024 | 4/1981 | Desserre | 360/104 |
| 4,739,431 | 4/1988 | Yasuda et al. | 360/126 |
| 4,809,103 | 2/1989 | Lazzari | 360/104 |
| 4,949,207 | 8/1990 | Lazzari | 360/126 |

FOREIGN PATENT DOCUMENTS 58-21329  4/1983  Japan .

OTHER PUBLICATIONS

"Damped Head Arm", Norwood, IBM Tech. Disc. Bull., vol. 21, No. 8, Jan. 1979, pp. 3093.

Primary Examiner—Robert S. Tupper

[57] ABSTRACT

A small light-weight thin film magnetic head apparatus for a rigid disk or a floppy disc. The apparatus includes a magnetic head formed directly on a distal end of a suspension as a thin layer, one end of the suspension being supported by an arm. This magnetic head is very small-sized and light-weight and has a head gap in direct contact with a recording medium, increasing the recording density and the read/write speed. Because of its reduced weight of the thin film magnetic head, a remarkably improved degree of followability with respect to the recording medium can be achieved. A method of manufacturing this magnetic head apparatus is also disclosed.

6 Claims, 6 Drawing Sheets

THIN FILM MAGNETIC HEAD APPARATUS AND METHOD OF MANUFACTURING THE SAME

BACKGROUND OF THE INVENTION

1. Field of the Invention:

This invention relates to a magnetic disc apparatus and a method of manufacturing the magnetic disc apparatus. More particularly the invention is directed to an improvement to the structure of a magnetic head for such an apparatus.

2. Description of the Related Art:

Because they are capable of recording of a large quantity of data and also enable a random access, magnetic disc drives have hitherto been performing the central part in file memories of data processing systems and computer systems. Practically, the main performance of a magnetic disc drive is evaluated from the recording density and the mean access time (time necessary to locate a magnetic head in a predetermined track). This mean access time is proportional to the square root of mass of a movable member and hence can be shortened by reducing the mass of the movable member. The more the magnetic head moves closer to a magnetic recording medium surface, the higher the recording density and the larger the output can be obtained.

FIGS. 8 and 9 of the accompanying drawings are a side elevational view of a conventional bulk flying magnetic head apparatus and a side elevational view of a conventional thin film flying magnetic head apparatus, respectively, which are disclosed, for example, in Journal of The Japan Society of Mechanical Engineers, volume 87, No. 791, issued on October 1984. Similar flying head slider is further disclosed in Japanese Patent Publication No. 21329/1983. In FIGS. 8 and 9, the conventional flying magnetic head apparatus generally comprises a magnetic recording medium 1 rotationarily movable in the direction of an arrow a, and a flying head slider 2 carrying a magnetic head 3. The magnetic head 3 is urged upwardly by air flow b so as to form a distance between the surface of the magnetic recording medium 1 and the magnetic head 3. The flying magnetic head apparatus also includes a suspension 5 made of a flexible material and held on a distal end of the flying head slider 2, and an arm 6 holding the suspension 5.

In this conventional magnetic head apparatus, as the magnetic recording medium 1 is rotated at a constant speed, an air flow b is created under the flying head slider 2 so that the flying head slider 2 is urged upwardly like a flying object. Meanwhile, since the suspension 5 is made of a flexible material and urges the magnetic head 3 against the magnetic recording medium 1, writing and reading are conducted, with a constant distance h between the magnetic head 3 and the head gap 4, due to the balance between the downward resilient force of the suspension 5 and the upward flying force of the flying head slider 2. The distance h between the magnetic head 3 and the magnetic recording medium 1 is a reference recording and reproducing characteristic. Since even a slight fluctuation of the space will be a cause for writing/reading error, it has been a common practice to minimize the distance with maintaining the followability to vertical vibrations while the magnetic recording medium surface is in rotation. For the time being, the distance of about 0.2 $\mu$m has been realized.

As discussed above, in the conventional magnetic head apparatus, the distance h between the head gap 4 and the magnetic recording medium 1 is kept constant by utilizing the flying force of the flying head slider 2. However, reduction of the weight and size of the flying head slider 2 has already reached the limit range according to the present machining technology. Thus, further increase of the access speed is not achievable by the use of the conventional devices. In order to increase the access speed, the weight of the head slider must be reduced, because the access time is proportional to the square root of a movable member which includes the head slider.

SUMMARY OF THE INVENTION

It is therefore an object of this invention to provide a magnetic head apparatus in which a flying head slider is omitted to reduce the weight of a magnetic head remarkably and to increase the read/write speed. In addition, the flying distance h of the magnetic head is substantially zero to bring the magnetic head unlimitedly close to a magnetic recording medium so that a high recording density and an increased output can be obtained.

Another object of the invention is to provide a method of manufacturing the above-mentioned magnetic head apparatus.

According to a first aspect of this invention, there is provided a thin film magnetic head apparatus, comprising: an arm; a suspension held by the arm; and a thin film magnetic head formed directly on a distal end of the suspension integrally therewith for writing data in a magnetic recording medium and reading the data from the magnetic recording medium.

According to a second aspect of this invention, there is provided a method of manufacturing a thin film magnetic head apparatus, comprising the steps of: forming an insulating layer on a distal end of a suspension; patterning a lower core on the insulating layer; further patterning a coil on the lower core in an insulated manner; further forming an upper core connected to the lower core and surrounding one strip of the coil, and providing a gap at an upper end of the upper core; and covering the cores and the coil with an insulating layer.

With the arrangement of this invention, the thin film magnetic head can perform the writing and reading of data in a posture in which the magnetic head is unlimitedly close to a magnetic recording medium.

The above and other advantages, features and additional objects of this invention will be manifest to those versed in the art upon making reference to the following detailed description and the accompanying drawings in which several preferred structural embodiments incorporating the principles of this invention are shown by way of illustrative example.

BRIEF DESCRIPTION OF THIS DRAWINGS

DETAILED DESCRIPTION

Figure 1:
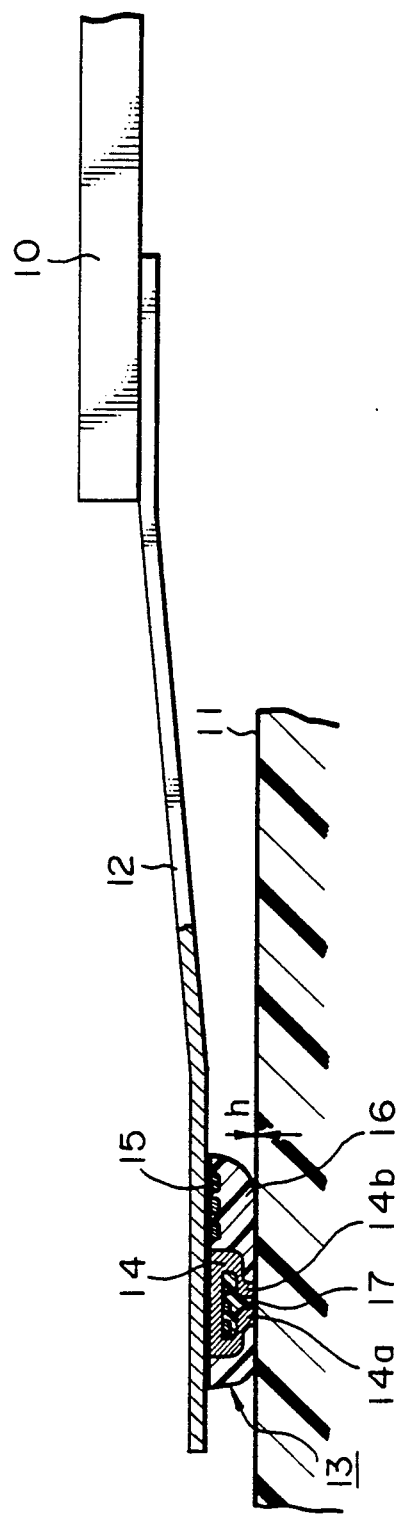
FIG. 1 is a side elevational view, partially broken away, of a thin film magnetic head apparatus embodying this, invention.

The principles of this invention are particularly useful when embodied in a thin film magnetic head apparatus such as shown in FIG. 1.

In the magnetic head apparatus of FIG. 1, an arm 10 is reciprocatingly driven by a drive mechanism and is located near a magnetic recording medium 11 adapted to be driven for rotation. A suspension 12 of a flexible material is fixed at one end to the arm 10, and a magnetic head 13 is formed directly on a distal end portion of the suspension 12 in a thin layer form.

The suspension 12 is a thin plate of stainless steel and has flexibility sufficient to bring the magnet head 13 close to the magnetic recording medium 11.

As the arm 10 is reciprocatingly driven, the magnetic head 13 is moved to a desired track of the magnetic recording medium 11. At that time the magnetic head 13 can be located close to the magnetic recording medium 11; a distance h between the magnetic head 13 and the magnetic recording medium 11 may be substantially zero.

As a result, according to this invention, an adequately increased recording density can be achieved, and a large output for reading can be obtained.

With this arrangement, since the magnetic head 13 is formed directly on the suspension 12 in a thin layer form, the weight of the magnetic head 13 is remarkably reduced so that the read/write speed of the magnetic recording medium 11 can be increased to a considerable extent. In FIG. 1, the magnetic head 13 includes a core 14, and a read/write coil 15 wound around the core 14. The core 14 and the read/write coil 15 are covered with a insulating protective layer 16 of non-magnetic material. The magnetic head 13 is manufactured by a thin film laminating method. Thus a very thin and lightweight head has been formed on the distal end of the suspension 12.

As shown in FIG. 1, only the distal ends 14a, 14b of the core 14 are exposed from the insulating protective member 16 to the exterior, there being defined between the two distal ends 14a, 14b a read/write gap 17.

Figure 2:
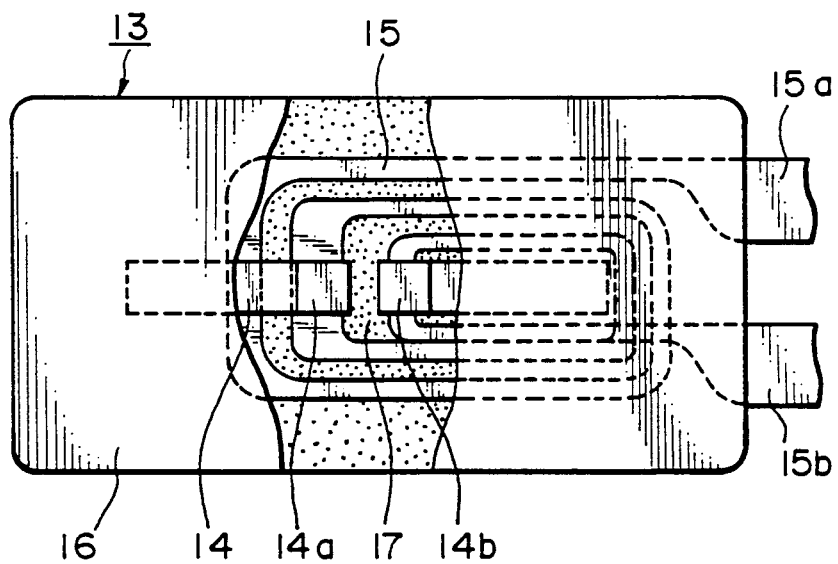
FIG. 2 is a plan view, partially broken away, of the apparatus of FIG. 1, showing a thin film magnetic head as viewed from the side of a magnetic recording medium.

FIG. 2 is a plan view of the magnetic head 13 of FIG. 1 as viewed from the side of the magnetic recording medium 11, with parts being broken away to show the laminated read/write coil 15 inside with ease.

As shown in FIG. 2, the read/write coil 15 is wound around the core 14 by three turns (practically 30 to 40 turns), and the two coil ends 15a, 15b lead from the magnetic head 13 and, though there is no illustration in the drawings, pass under the suspension 12 and are connected to an exterior read/write circuit.

As mentioned above, according to this embodiment, the magnetic head 13 is formed directly on the suspension 12 in a thin layer form. A series of manufacturing steps of this thin film magnetic head is illustrated in detail.

Figure 3A:
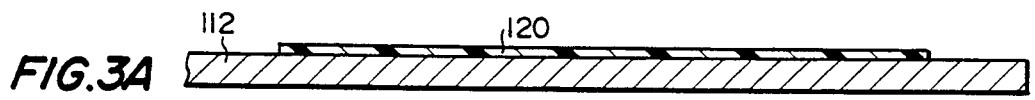
FIGS. 3A through 3H show various stages of a manufacturing method in which the magnetic head is directly formed on a suspension in a laminated thin layer form.

In FIG. 3A, an inorganic insulating layer 120 such as $Al_2O_3$ or $SiO_2$ is formed on the suspension 112.

Figure 3B:

In FIG. 3B, a magnetic layer is formed on the insulating layer 120 to make a patterning of the lower core 121, and a further insulating layer 122 is formed around the peripheral portion of the pattern.

Figure 3C:
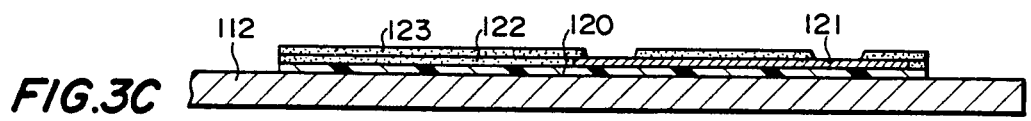

In FIG. 3C, an insulating layer 123 as a third layer is formed to make a patterning of the coil 15 in an insulating fashion with the core 121, at which time a pair of exposed portions is formed near the opposite ends of the lower core 121 so that the lower core 121 can keep the connection with an upper core described below.

Figure 3D:
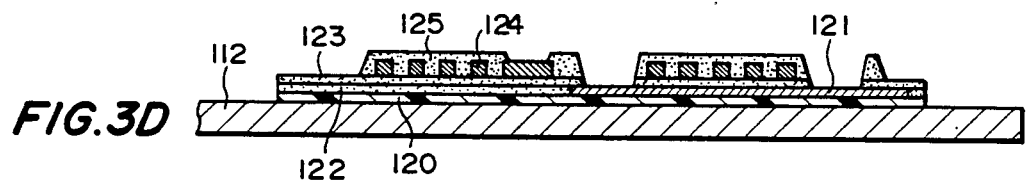

In FIG. 3D, an Al or Cu layer is formed on the insulating layer 123 to make a patterning of an lower coil 124, whereupon the pattern of the lower coil 124 is insulated by a protective layer 125 such as of $Al_2O_3$ or $SiO_2$.

Figure 3E:
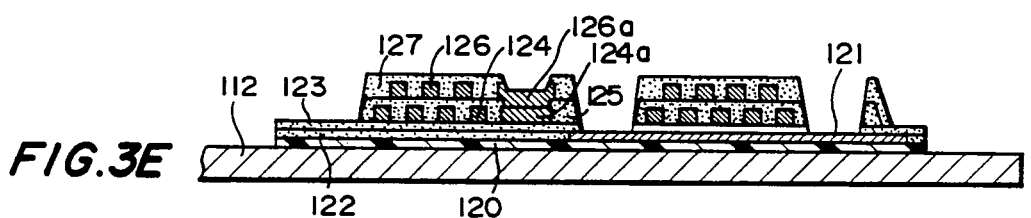

In FIG. 3E, an Al or Cu layer is formed on the upper coil 126 to make a patterning of the upper coil 126, and the upper and lower coils 126, 124 are interconnected at their terminals 126a, 124a.

Then the upper coil 126 is covered with an insulating layer 127.

Figure 3F:
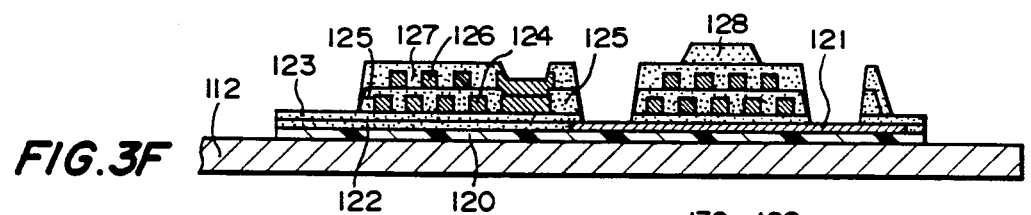

As the double-layer coil 124, 126 is thus formed on the lower core 121, an insulating layer 128 for forming a gap is formed as shown in FIG. 3F, whereupon as shown in FIGS. 3D, 3E and 3F, the end portions of each of the insulating layers 125, 127, 128 are tapered so that any break of the upper core (to be formed next) due to the difference in height of layers can be prevented.

Figure 3G:
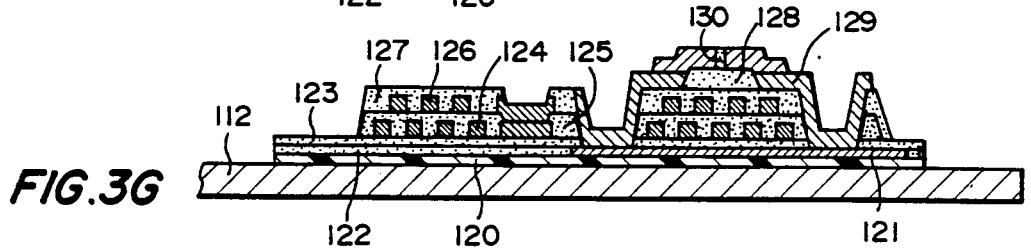

Specifically, as shown in FIG. 3G, an upper core 129 in a magnetic layer form is formed on the lower core 121 so as to surround one side of the doublelayer coil 124, 126, leaving a gap 130 during the forming of the upper core 129.

Since each of the insulating layers 125, 127, 128 is tapered, the upper core 129 is prevented from any break or cut due to the difference in thickness of layers during the patterning of the upper core 129.

Figure 3H:
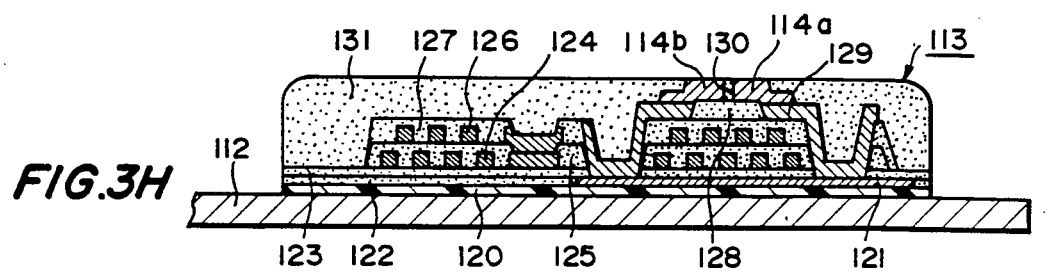

In FIG. 3H, a insulating protective layer 131 such as $Al_2O_3$ or $SiO_2$ is formed to protect the core 129 and the two coils 124, 126; this finalizes the forming of the magnetic head 113, at which time the core ends 114a, 114b are exposed from the insulating layer 131 to define therebetween the gap 130.

The magnetic head 113 thus formed on the suspension 112 has a thickness of several tens μm, thereby resulting in a very thin light-weight magnetic head.

The patterning of the lower and upper cores 121, 129 may be conducted preferably by a wet process utilizing a frame plating method, or a dry process utilizing a spatter method and a dry etching method.

Generally, an NiFe film is used as the magnetic layer in the wet process, and on the other hand, a sendust or cobalt-base amorphous layer is used in the dry process. Accordingly a magnetic layer of high magnetic flux density can be obtained.

In the previous embodiment, the individual magnetic head 13, 113 is disposed close to the magnetic recording medium by utilizing the flexibility of the respective suspension 12, 112. To obtain an increased degree of closeness between the magnetic head 13, 113 and the recording medium, second and third embodiments shown in FIGS. 4 and 5 are preferable.

Figure 4:
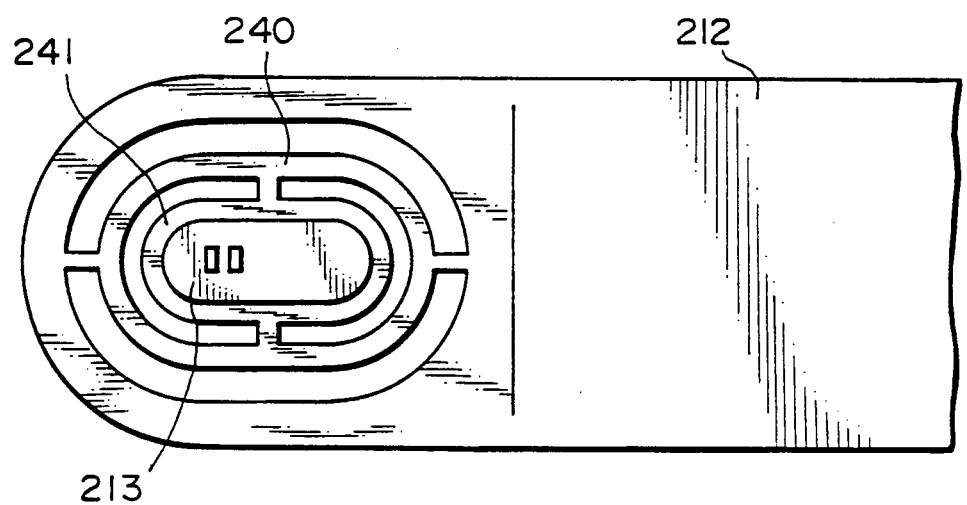
FIG. 4 is a plan view of another embodiment in which a thin film magnetic head is directly formed on a double gimbal spring supported on the distal end of a suspension.

In the second embodiment of FIG. 4, a double gimbal spring 240, 241 is formed directly on the distal end of the suspension 212, and a magnetic head 213 similar to that of FIGS. 1, 2 and 3 is formed centrally of the gimbal spring 241.

Because of the double gimbal spring 240, 241, the magnetic head 213 is freely tiltable in two axial directions so that the magnetic head 213 is normally kept close to the magnetic recording medium by the action of gimbals even when the suspension 212 is not perfectly parallel to the magnetic recording medium. In particular, even when the magnetic recording medium is vibrated or tilted while rotating, adequate followability of the magnetic head can be achieved.

Figure 5:
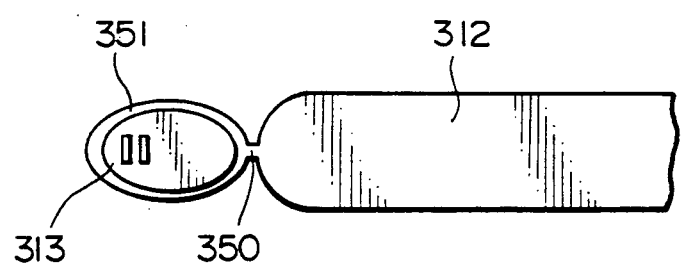
FIG. 5 is a plan view of still another embodiment in which a thin film magnetic head is formed on a support member connected at its neck to the distal end of a suspension.

In the third embodiment of FIG. 5, a magnetic head 313 is formed directly on a substrate or support member 351 connected at its neck 350 to the distal end of a suspension 312. This neck 350 gives excellent flexibility to the support member 351 and thus the magnetic head 313 so that good closeness between the magnetic head 313 and the magnetic recording medium can be maintained.

This invention should by no means be limited to the specific structure shown in FIGS. 4 and 5; for example, a Winchester-type or a Watlas-type support structure may be used.

In the foregoing magnetic head apparatus, the weight of the distal end of the suspension can be reduced by omitting a flying head slider, and the distance h between the head gap and the magnetic recording medium can be reduced to substantially zero.

Figure 6:
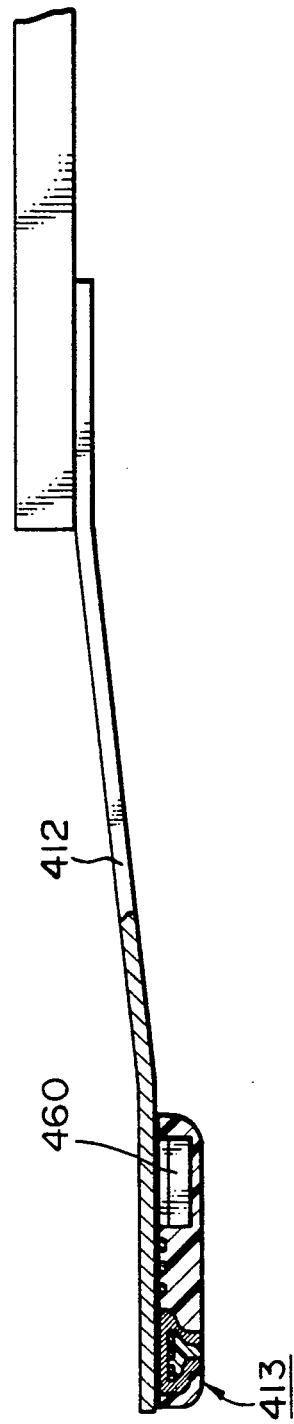
FIG. 6 is a side elevational view, partially broken away, of a further embodiment in which a head amplifier is formed in a magnetic head in a thin layer form while the magnetic head is being formed.

FIG. 6 shows a fourth embodiment, in which a magnetic head 413 is formed directly on a suspension 412, during which time a head amplifier 460 also is formed in a thin film form concurrently with the forming of the magnetic head 413, thus causing an improved degree of manufacturing efficiency.

Further, in this case, it is possible to shorten (omit) wires between the head amplifier 460 and the magnetic head 413 so that the latter is prevented from picking up any noise.

Figure 7:
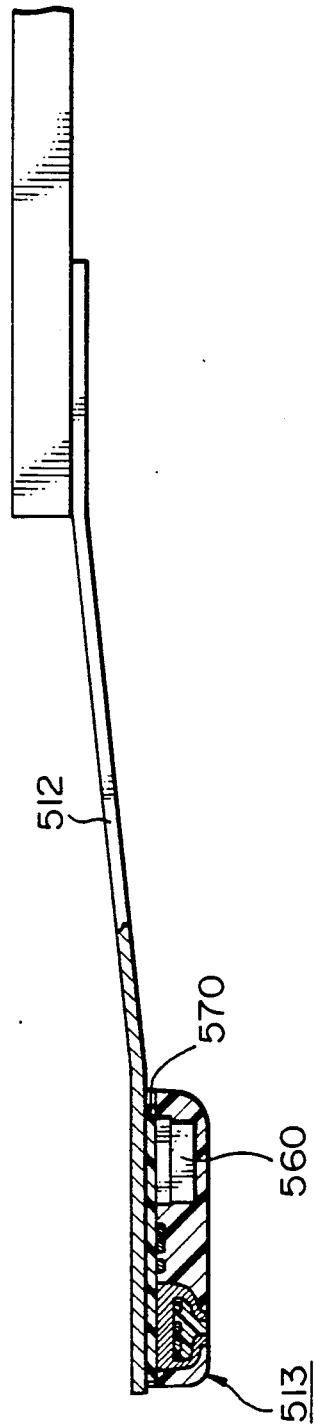
FIG. 7 is a view similar to FIG. 6, showing a still further embodiment in which a magnetic head is formed on a suspension with an intermediate layer disposed therebetween.
Figure 8:
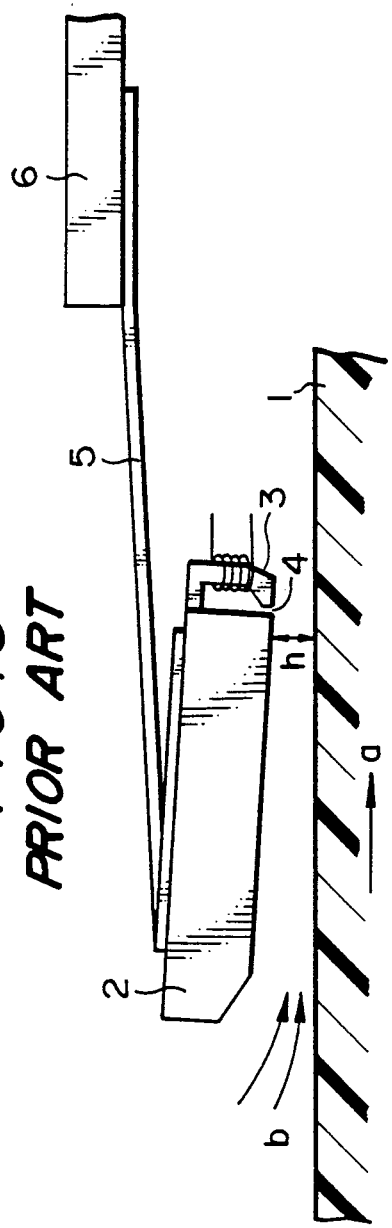
FIG. 8 is a side elevational view showing a conventional bulk magnetic head apparatus.
Figure 9:
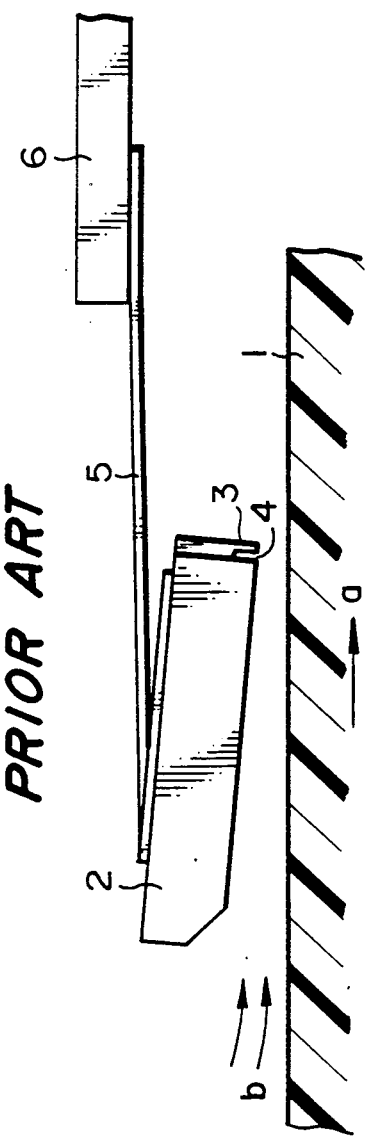
FIG. 9 is a side elevational view showing a conventional thin film magnetic head apparatus.

FIG. 7 shows a fifth embodiment, in which an intermediate layer 570 such as of silicon wafer or ceramic is sandwiched between a suspension 512 and both a magnetic head 513 and a head amplifier 560. With this silicon or ceramic intermediate layer 570, improved adhesion between the suspension 512 and both the magnetic head 513 and the head amplifier 560 can be achieved.

To sum up the foregoing, according to this invention, since the thin film magnetic head apparatus comprises a suspension held by an arm, and a thin film magnetic head formed directly on the distal end of the suspension integrally therewith for writing data in a magnetic recording medium and reading the stored data from the magnetic recording medium, it is possible to reduce the weight of the magnetic head remarkably and to shorten the read/write time greatly, thus obtaining a high recording density and a large output.

What is claimed is:

1. A thin film magnetic head apparatus, comprising;
   (a) a suspension held by an arm;
   (b) a thin film formed magnetic head formed directly on and in physical contact with a distal end of said suspension for storing data in a magnetic recording medium and reading the stored data from the magnetic recording medium;
   (c) a head amplifier formed directly on and in physical contact with said distal end; and
   (d) said magnetic head and head amplifier being located on the same surface of said suspension and being directly adjacent to each other.

2. A thin film magnetic head apparatus according to claim 1, further including an insulating layer covering said head amplifier and said magnetic head, with a portion of said magnetic head being exposed so that it may be in operative association with the magnetic recording medium.

3. A thin film magnetic head apparatus according to claim 2, wherein said insulating contacts a portion of said suspension.

4. A thin film magnetic head apparatus, comprising;
   (a) a suspension held by an arm; and
   (b) a thin film magnetic head formed directly on a distal end of said suspension integrally therewith, wherein an intermediate layer of silicon or ceramic is disposed between said thin film magnetic head and said suspension to improve adhesion between said thin film magnetic head and said suspension.

5. A thin film magnetic head apparatus of claim 4, further including a head amplifier located at said distal end and wherein, said intermediate layer improves adhesion of between said head amplifier and said suspension.

6. A thin film magnetic head apparatus according to claim 5 further including an insulating layer covering said head amplifier and said magnetic head, with a portion of said magnetic head being exposed so that it may be in operative association with the magnetic recording medium.

* * * * *